Aug. 19, 1952  F. M. HILL ET AL  2,607,420
PAPER-CUTTING MACHINE
Filed Nov. 13, 1947  9 Sheets-Sheet 7

INVENTORS.
FRANK M. HILL
JAMES W. GOFF
BY
Ernest R. Llewellyn
ATTORNEY

Aug. 19, 1952　　　　F. M. HILL ET AL　　　　2,607,420
PAPER-CUTTING MACHINE

Filed Nov. 13, 1947　　　　　　　　　　9 Sheets-Sheet 8

INVENTORS.
FRANK M. HILL
JAMES W. GOFF
BY
Ernest R. Llewellyn
ATTORNEY

Patented Aug. 19, 1952

2,607,420

UNITED STATES PATENT OFFICE 2,607,420

PAPER-CUTTING MACHINE

Frank M. Hill, Walpole, and James W. Goff, Taunton, Mass., assignors, by mesne assignments, to Harris-Seybold Company, Cleveland, Ohio, a corporation of Delaware Application November 13, 1947, Serial No. 785,700

5 Claims. (Cl. 164—54)

This invention relates to paper and the like processing machines and more particularly to machines for cutting or trimming fibrous sheets disposed in a stack formation.

As is well known in the art there are two types of machines in general use for cutting or trimming a stack of fibrous sheets. One type of machine may be conveniently termed a "power machine" which is usually of a large size and capacity and adapted to be used where the expense of such a machine is warranted. The second type of machine may be designated as a "hand operated" machine which is adapted to the needs of a field of users that require a lesser capacity or wherein the added expense of a power machine is unwarranted.

It has been the general practice to provide a hand operated fibrous sheet cutting machine with a table on which a stack of sheets to be trimmed or cut may be disposed. Adjustments for positioning the stack usually require the operator to move around the machine and consume a considerable amount of time. A separate hand operation is likewise required to clamp the stack adjacent to the cutting knife and an independent device is provided to force the cutting knife through the stack. Still another manual operation is required to release the stack clamp.

Accordingly, one of the primary objects of the present invention is to provide a hand operated machine for cutting or trimming a stack of fibrous sheets and wherein the adjustments for positioning the stack and the means for clamping the stack and operating the cutting knife are arranged in a manner that permits the operator to manually perform the functions from substantially a single convenient operating position.

Another principal object of the invention is to simplify and combine the operation of clamping the stack and actuating the cutting knife and in a manner whereby the clamping mechanism functions in a positive relation in advance of the beginning of movement of the cutting knife.

Still another object of the invention is to provide improved means for actuating the cutting knife whereby the capacity of the machine is increased and the manual power required is reduced substantially.

A further object of the invention is to construct a machine of the present character wherein the cutting edge of the knife is automatically guarded when the knife is disposed in its inoperative position and in a direct relation to the position of the stack clamp.

A still further object of the invention is to provide a machine for cutting or trimming a stack of fibrous sheets that is simple and efficient with a minimum of working parts that may be manually actuated with a reasonable amount of effort.

The foregoing objects are intended as a general explanation and are not to be construed as limiting the invention thereto as other objects and advantages will become apparent from the following detailed description of a preferred form of the invention as illustrated by the accompanying drawings and forming a part hereof.

Referring to the drawings.

The machine frame and tables

The machine is provided with opposed side frames 10, 11 that are retained in a spaced apart relation by a rear brace frame 12 and a front brace frame 13. A table 14 is supported by the machine frames and is adapted to receive a stack of the material A that is to be operated upon. Secured to the front of each side frame 10, 11 is a pair of supplemental side frames 15, 16 that are retained in a spaced apart relation relative to the front faces of the side frames 10, 11 by means of spacers 17 disposed between the flanged end faces of the frames and secured together with bolts 18 in a manner that provides opposed guide openings 19, 20 between the flanged end faces of each side frame 10, 11 and its associated front frame 15, 16. Each supplemental or front side frame 15, 16 is provided with an extension 15a, 16a that is provided with a horizontally disposed guide adapted to slidably support a front table 21. The inner end face 21a is yieldingly urged against the forward end face 14a of the material supporting table 14 for a purpose to be further described.

The combined back gauge and measuring device

Figures 8, 9, 10, 11, 12, 13:
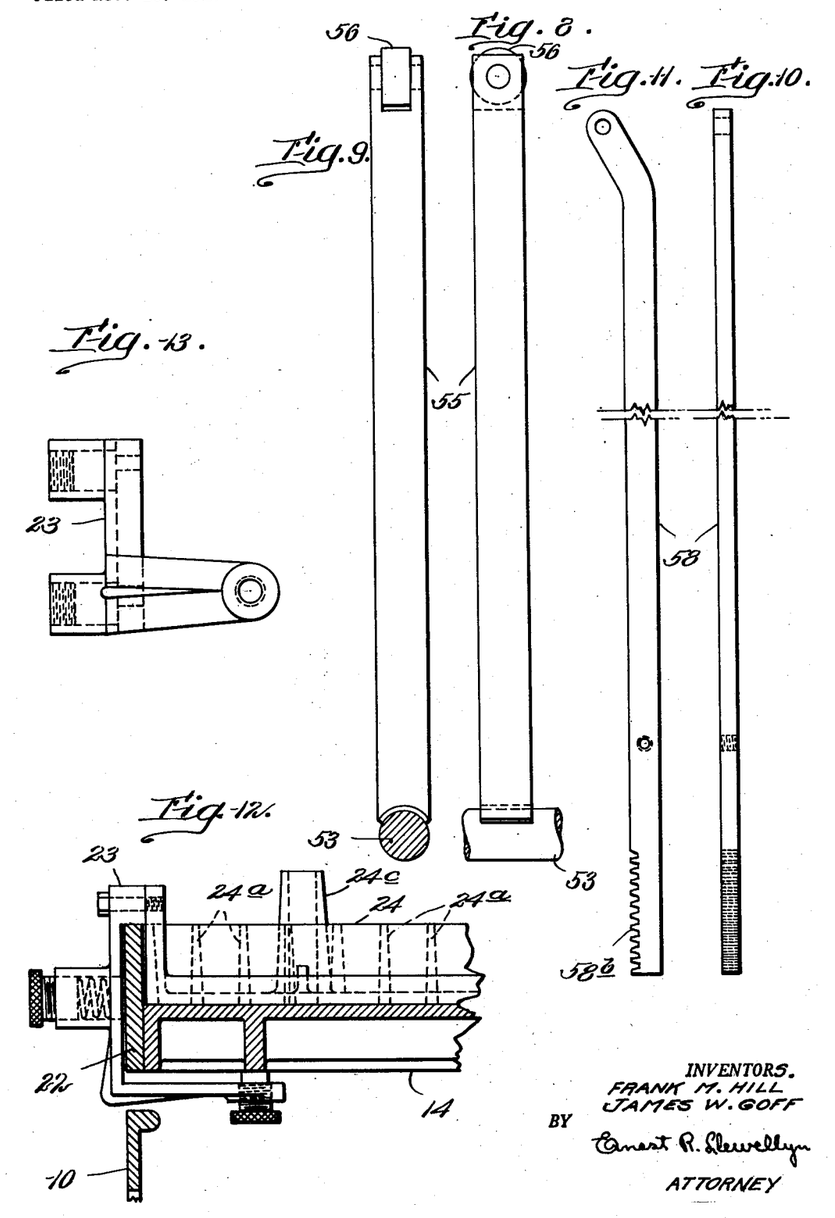
Fig. 8 is a front view detail of one of the knife holder push rods and its supporting shaft.
Fig. 9 is a side elevation of the push rod shown at Fig. 8.
Fig. 10 is a front view detail of the operating rack.
Fig. 11 is a side elevation of the rack shown at Fig. 10.
Fig. 12 is a section taken substantially along line 12—12, Fig. 4.
Fig. 13 is a detail of the back gauge carrier shown in Fig. 12.
Figure 14:
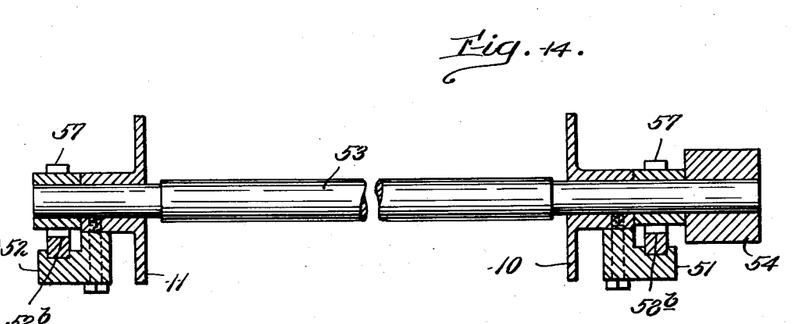
Fig. 14 is a section taken substantially along line 14—14, Fig. 1.
Figure 15:
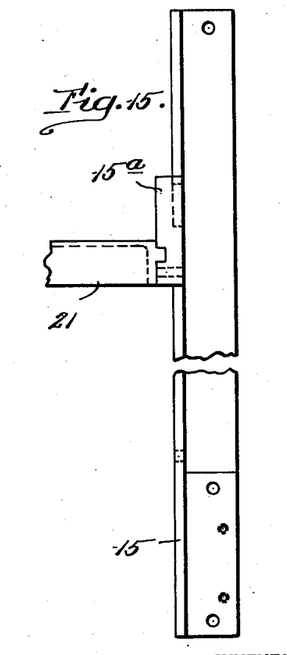
Fig. 15 is a front elevation of the forward table support.
Figure 16:
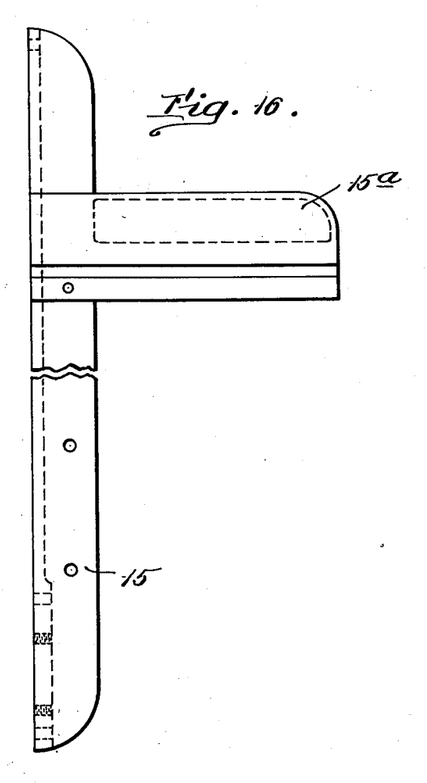
Fig. 16 is a side elevation of the table support shown at Fig. 15.
Figures 17, 18:
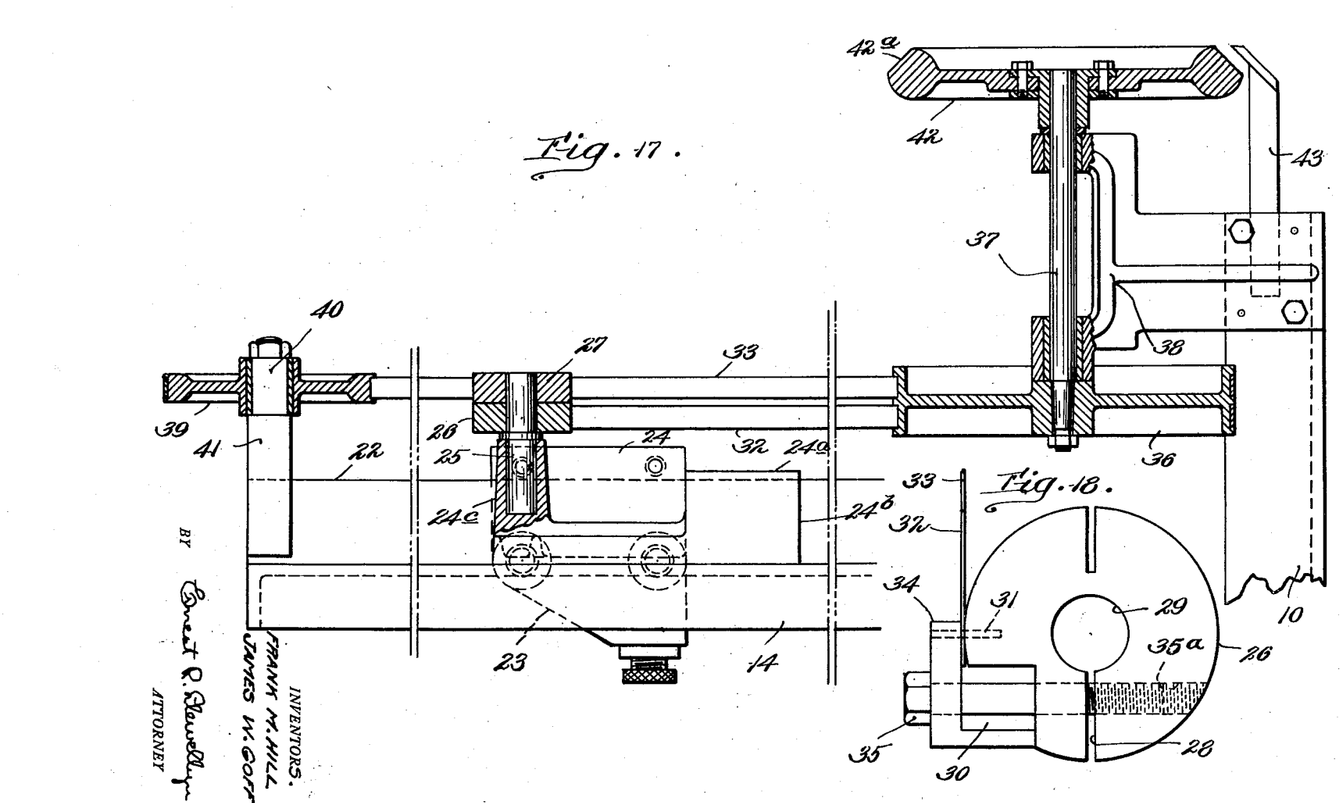
Fig. 17 is a longitudinal section taken substantially along line 17—17, Fig. 4.
Fig. 18 is a plan view detail of one of the back gauge band clamps.

Fixedly associated with the machine side frame 10 and stack supporting table 14 is a guide rail 22 that is adapted to slidably support a holder 23 to which the back gauge 24 is attached. As shown at Fig. 12 the back gauge 24 rests on the upper face of the table 14 and is provided with forwardly extending ribs 24a having end faces 24b that are adapted to engage with a stack of the material positioned on the table face between the back gauge and the cutting knife to be hereinafter described. This back gauge 24 is provided with a vertically extending bearing 24c that rotatably supports a stud 25, see Fig. 17, having a pair of clamp discs 26, 27 secured to its upper portion. These clamp discs, one 26 of which is shown in detail at Fig. 18, are each provided with a slot 28 that extends from its bore 29 to the outer periphery of the disc. Each disc is also provided with a notch 30 and a pin 31 and each disc pin 31 engages in a hole in the terminating end of a pair of steel tapes 32, 33. In the present instance a substantially L-shaped clamp member 34 likewise engages with the disc pin 31 and is secured to the clamp disc by means of a bolt 35 that engages in a threaded bore 35a in the clamp discs 26, 27 for a purpose to be later described.

As best illustrated at Fig. 17, the lower steel tape 32 engages one side of and has its opposed end secured to a drum 36 that is secured to the lower end of a shaft 37 rotatably mounted in a suitable stationary bearing bracket 38 secured to the machine frame. The upper steep tape 33, having one end secured to the disc 27, passes around an idler 39 that is rotatably mounted on a stud 40 that is fixedly supported in a suitable bearing 41 affixed to the guide rail 22. This tape 33 engages with the opposite side of the drum 36 from the lower tape 32 and likewise has its terminating end secured to the drum 36. Secured to the upper end of the front shaft 37 is a hand wheel 42 having a face 42a which is provided with suitable graduations (not shown) such as are in general use and adapted to coact with a fixed pointer 43 in the rotating and positioning the handwheel 42 and its related instrumentalities.

The front end stack clamp and cutting knife

The top stack clamp comprises a carrier 44 that extends transversely of the machine and is provided with opposed end portions 44a that engage in the machine front end guide-ways 19, 20. This carrier 44 is provided with a recess 44b adapted to receive a strip of replaceable material 46 that is secured to the carrier 44 by means of a clamp strip 47. This strip of material 46 is of such character that the sharpened edge of the cutting knife will not be damaged when engaged therewith.

Likewise extending transversely of the machine is a knife holder 48 with its opposed ends engaging in the front end guide-ways 19, 20 and pivotally connected with the machine frame by means of a link 48a. The cutting knife 49 is secured to the holder 48 by suitable means and its horizontal plane may be adjusted, as in this instance, by suitable adjusting screws 50.

Slidably disposed in the lower part of each of the guide-ways 19, 20 are bearing blocks 51, 52 that rotatably support the opposed end portions of a shaft 53 having an operating lever 54 secured to one end thereof.

Disposed between the knife holder 48 and the shaft is a pair of push rods 55 that are vertically movable in suitable guide-ways. The lower end of each of the push rods 55 has its bearing on the shaft 53 and the upper ends of the rods are provided with rotatable rollers 56 that engage with the knife holder 48 in a manner that retains the shaft 53 and knife holder 48 in a determinate spaced apart relation.

Gears 57 are secured to the opposed end portions of the shaft 53 and these gears mesh with teeth formed in the lower end of vertically guided members 58 that are pivotally connected to the carrier 44. Pivotally connected to the machine side frame 10 is a foot lever 59 that engages with one of the members 58 in a manner whereby the members 58 may be caused to move downwardly when pressure is exerted on this foot lever 59.

Operation of the machine

A stack of sheets A to be cut is placed on the table 14 and the operator then rotates the hand wheel 42 to actuate the back guide 24 through means of the opposed steel tapes 32, 33 until the pointer 43 registers with the proper graduation on the hand wheel face 42a to indicate an accurate measurement from the forward face 24b of the back guide 24 to a cutting line of the machine knife 49.

Figure 1:
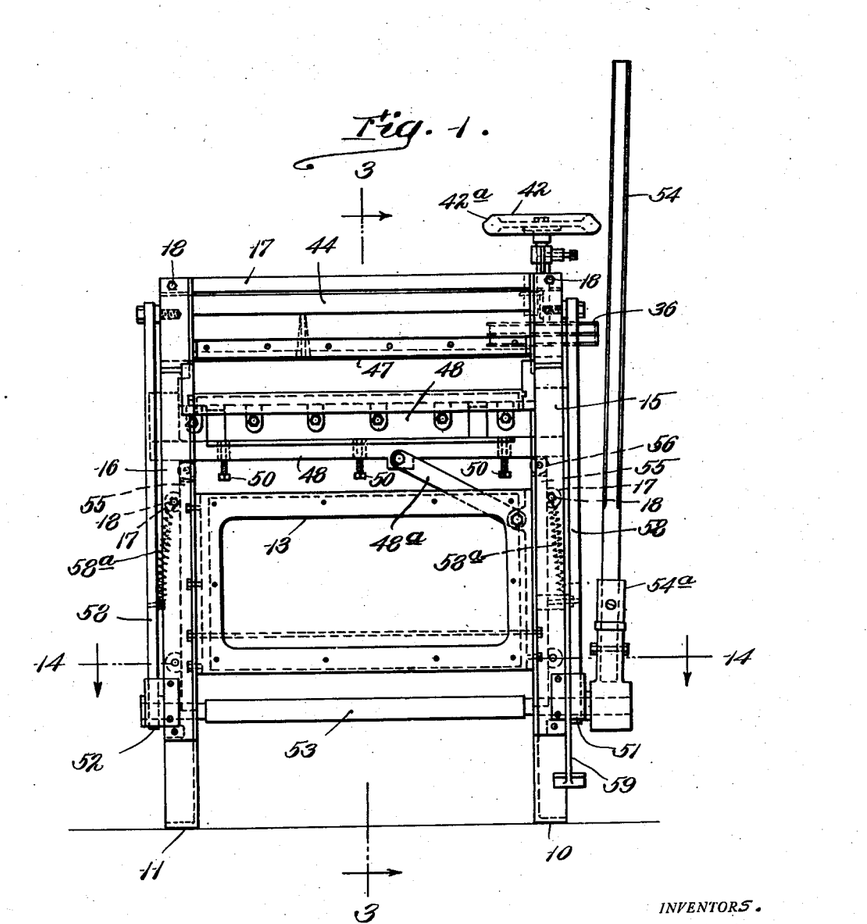
Fig. 1 is a front elevation of the machine.
Figure 2:
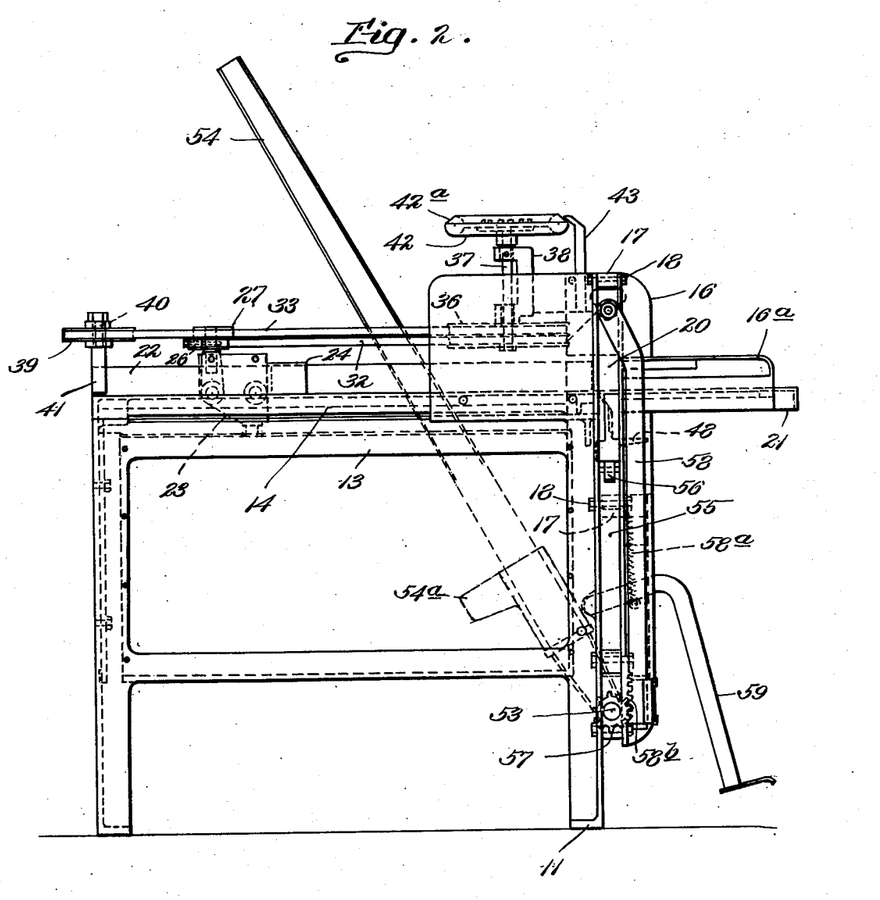
Fig. 2 is a right hand side elevation of the machine shown at Fig. 1.
Figure 3:
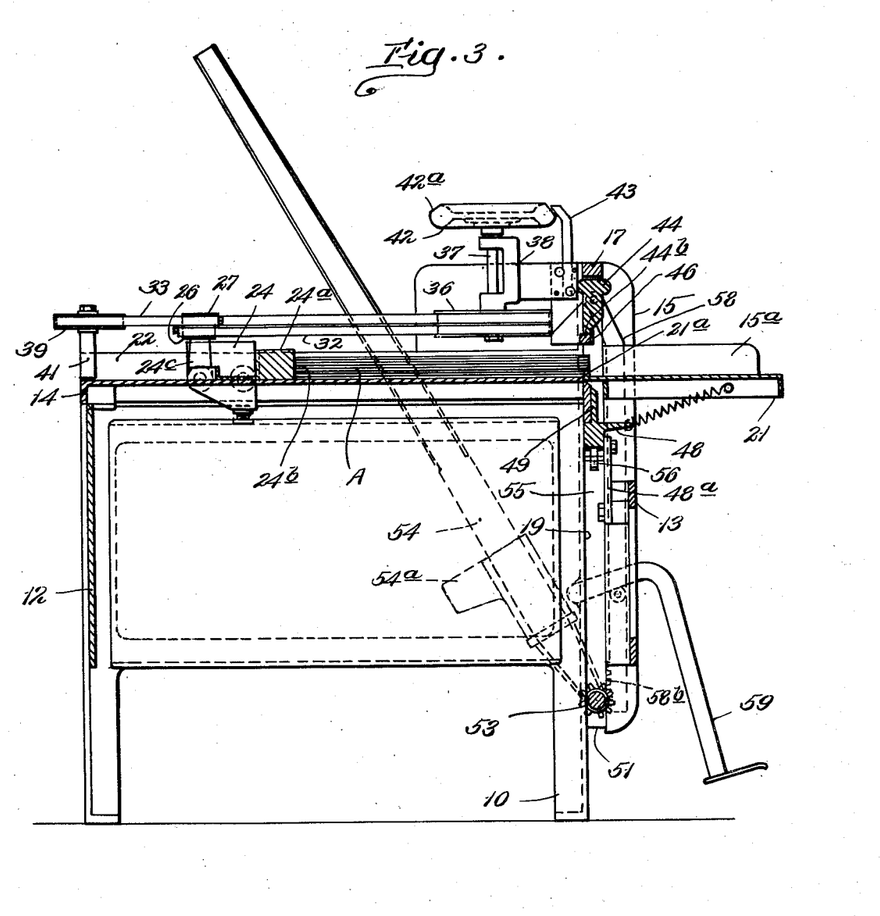
Fig. 3 is a section taken substantially along line 3—3, Fig. 1.
Figure 4:
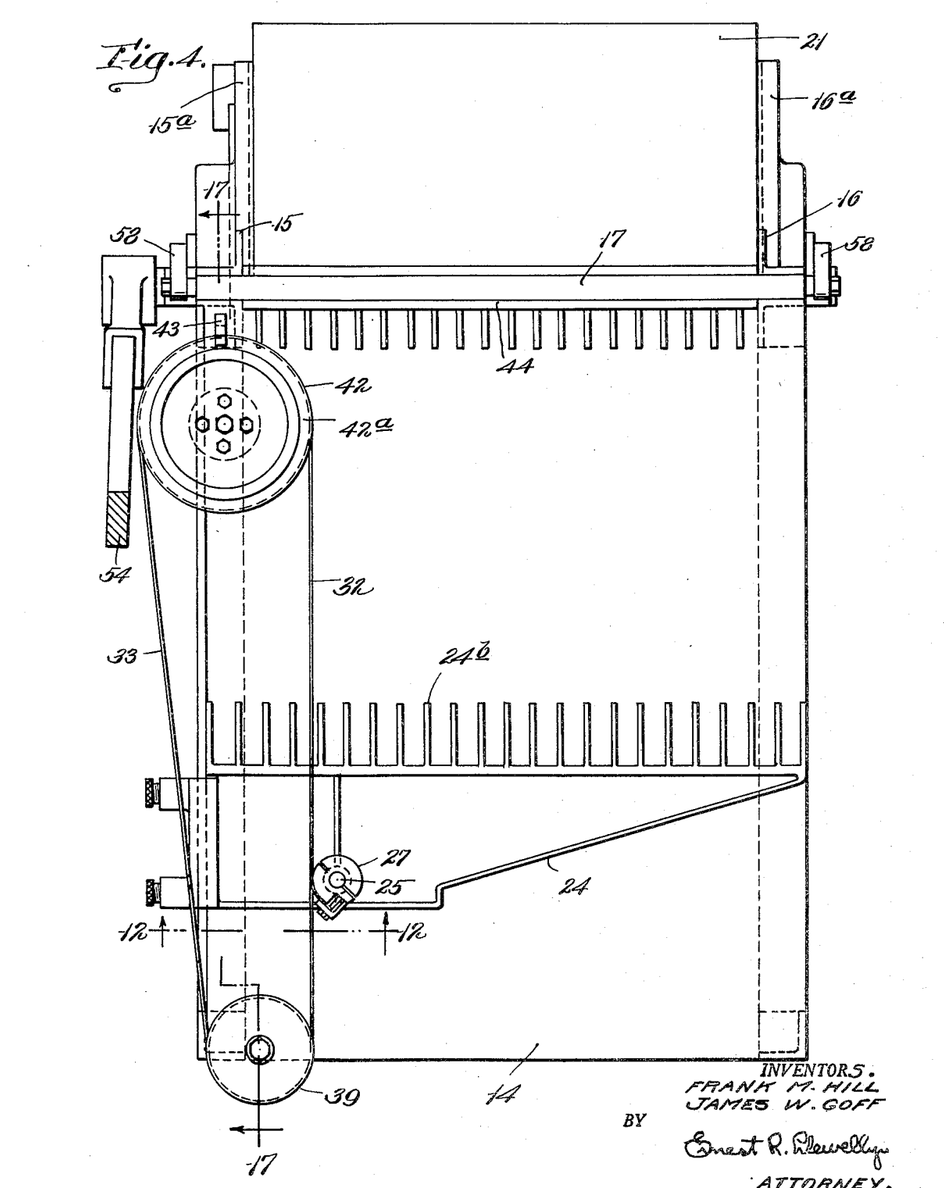
Fig. 4 is a plan view of the machine as illustrated at Fig. 1.
Figures 5, 19:
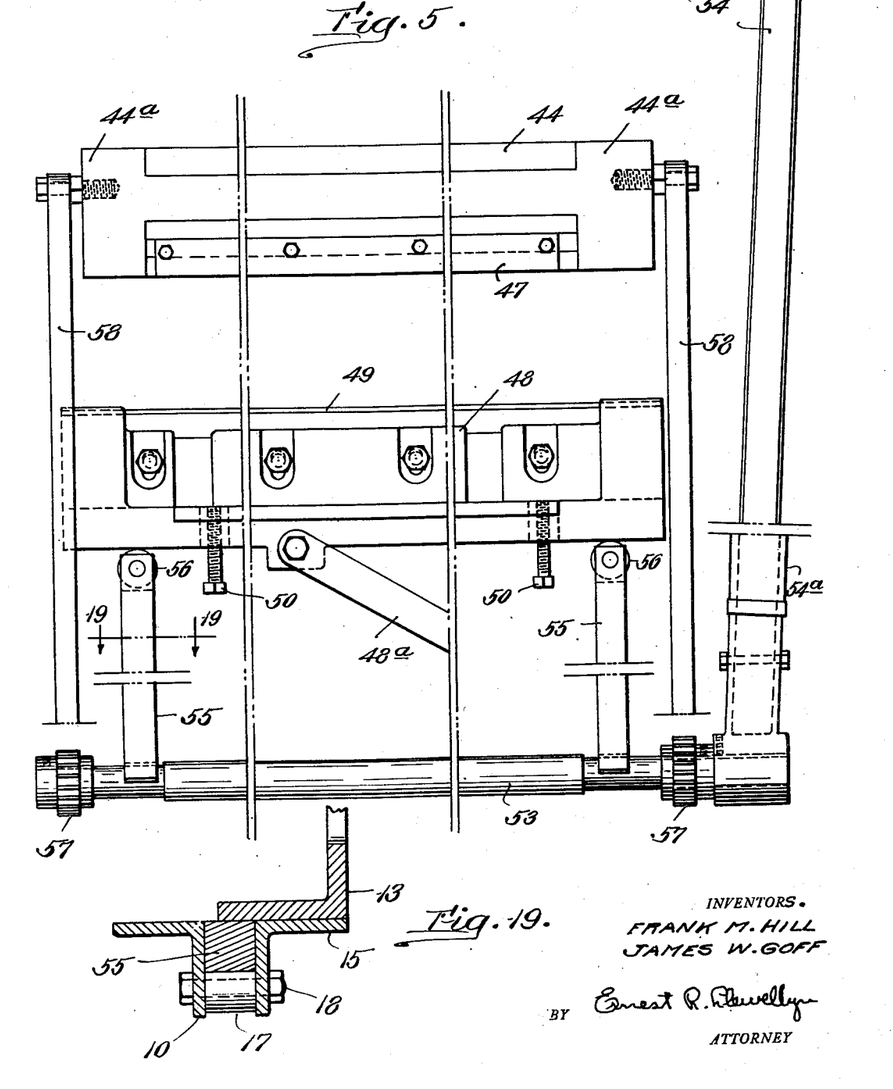
Fig. 5 is a front view assembly detail of the main shaft, knife holder and stack clamp with the single operating lever.
Fig. 19 is a section taken substantially along line 19—19, Fig. 5.
Figure 6:
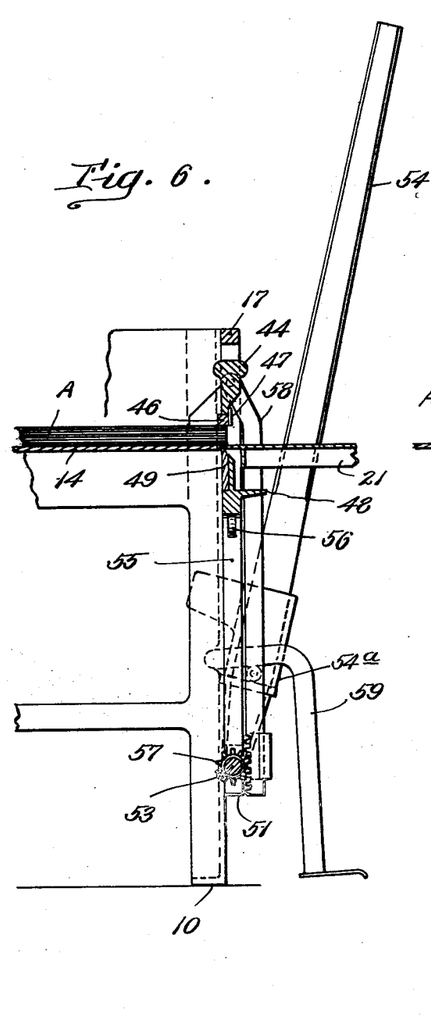
Fig. 6 is a detail sectional elevation of the main shaft, knife holder and stack clamp with their operating connections and mechanism.
Figure 7:
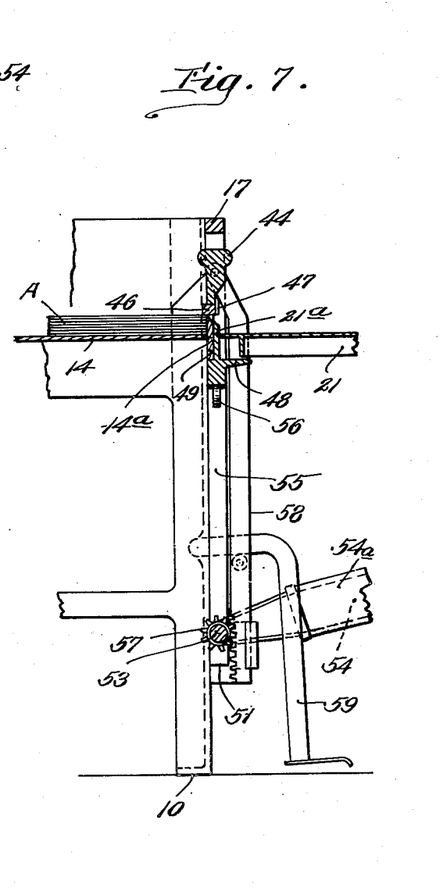
Fig. 7 is a view corresponding substantially to Fig. 6 but shows some of the parts in a different position.

As the operator depresses the foot lever 59 both of the clamp links 58 are caused to be moved downwardly against the action of their return springs 58a until the clamp bar 44 engages with the forward end of the upper face plane of the stack A with the clamp bar strip 46 positioned in line with the cutting edge of the machine knife 49. Downward movement of the clamp links 58 through engagement of their rack teeth 58b rotates the shaft pinions 57, see Figs. 6 and 7, and further rocks the operating lever 54 from its rearward inoperative position to a forward position where it may be readily reached by the operator.

It is to be noted that when the clamp bar 44 is in engagement with the top of the stack A further downward movement of the links 58 is arrested and accordingly their rack teeth become stationary.

Further forward movement of the operating lever 54 will rotate the pinions 57 with their teeth enmeshed with the stationary rack teeth 58b and thus move the shaft 53 in an upwardly direction. As the shaft 53 is moved upwardly the push rods 55 will cause the knife carrier 48 and knife 49 to be elevated toward engagement with the underside face of the stack and that is to be cut. Continued forward movement of the operating lever 54 will cause further rotation of the pinions 57 in the stationary rack teeth 58b and force the cutting edge of the knife 49 through the stack and against the stop 46 supported in the clamp member 44.

In the present structure it is to be noted that regardless of the thickness of height of the stack the knife 49 does not begin to elevate until the stack clamp 44 bears against the upper face of the stack A and acts as a stop for the rack teeth 58b and rotative movement of the pinions 57 will not function to elevate the cutting knife 49 until downward movement of the rack teeth 58b is arrested and thus forms a desirable safety feature.

As above described, the knife holder 48 has one end of a link 48a pivoted thereto with the opposed end of the link pivoted to a fixed support associated with the machine frame. This link 48a causes the knife holder 48 and knife 49 to be moved to a degree in a horizontal direction simultaneously with the vertical elevation of the holder 48 and together produce an angular shear through the thickness of the stack.

After the above cutting function has been completed, the operating handle 54 is released and the springs 58a urge the elements to their normal inoperative positions.

As arranged in the present structure, the cutting edge of the knife 49 is inoperatively disposed below the top face planes of the stack supporting table 14 and the slidable front table 21. As the beveled upper cutting edge of the knife 49 is elevated and engages with the forward edge 21a of the slidable table 21 the table is moved forward as the knife continues its upward movement and conversely, as the knife 49 is lowered to its inoperative position the spring again urges the table edge 21a into engagement with the forward edge of the machine table 14 and thus the cutting edge of the knife is again guarded.

While the form and arrangement of the parts as shown in the drawings and as above described are preferred, the invention is not to be limited to such form and arrangement except so far as the claims may be so limited, it being understood that changes might well be made in the form and arrangement of the parts by those skilled in the art without departing from the spirit and scope of the invention, and in which it is the intention to claim all novelty inherent in the invention as broadly as possible in view of the prior art.

What is claimed is:

1. A machine of the character specified comprising opposed side frames and a table for supporting material to be operated upon; oppositely disposed guide members associated with the forward end of said frame and table; a clamp member disposed above the face plane of said table and extending transversely thereof with opposed end portions of said clamp engaging with said guide members; a knife disposed below said table adjacent the forward end and extending transversely thereof; a knife holder for said knife and having its opposed end portions engaging with said guide members; a transverse shaft rotatably and bodily movable in said guide members with pinions secured to said shaft; connections associated with said clamp and including racks for each connection that are adapted for engagement with said pinions; other connections disposed between said shaft and said knife holder for moving said knife holder upwardly in direct relation to and with the same extent of movement as the bodily movement of said shaft; an operating member secured to said shaft and whereby rotative movement is imparted to said shaft to cause initial downward travel of said clamp into engagement with the work before upward movement of said knife occurs.

2. A machine of the character specified that includes a supporting table for a stack of material to be operated upon and a coacting clamp and cutting knife positioned relative to the forward end of the table, a single control means for actuating said clamp and knife in opposed operative and inoperative directions in sequence said means including rack bars connected to said clamp, a shaft, means for guiding said shaft for vertical bodily movement, pinions carried by said shaft and engaging said rack bars, means for supporting said knife directly from said shaft for upward travel therewith, a lever on said shaft for rotation thereof to cause initial downward travel of said rack in response to rotation of said pinions and consequent engagement of said clamp with the stack of material, said lever causing upward bodily travel of said shaft, said pinions and said knife in response to further lever movement following engagement of said clamp with said stack.

3. A machine as defined in claim 1 including means directly connected with said clamp actuating connections for yieldably urging said clamp to a raised clearance position.

4. A machine as defined in claim 2 including a foot pedal, and connections for causing initial downward movement of said rack bars and corresponding forward travel of said lever in response to actuation of said pedal.

5. A machine for cutting work material having in combination, a support for said material, a reciprocally movable coacting clamp and cutting knife, and means for actuating said clamp and knife into opposed operative and inoperative positions, said means including connecting elements for said clamp and knife in which a rotatable pinion meshes with a gear rack, means for guiding said clamp and rack for movement in a straight line path between said operative and inoperative positions, means including a shaft for rotating said pinion, means for guiding said shaft and pinion for movement in a path parallel with said straight line path, means for normally biasing both said clamp and said knife toward their respective inoperative positions, means connecting said rack with said clamp for effecting clamping movement thereof prior to knife movement, connections from said shaft directly to said knife to effect cutting movement thereof following the stopping of said clamping movement, and means for rotating said shaft to actuate said machine in initially clamping and then cutting said work material.

FRANK M. HILL.
JAMES W. GOFF.

REFERENCES CITED

The following references are of record in the file of this patent:

UNITED STATES PATENTS

| Number | Name | Date |
|---|---|---|
| Re. 8,736 | Clarke | June 3, 1879 |
| 223,744 | Malm | Jan. 20, 1880 |
| 245,008 | Morse | Aug. 2, 1881 |
| 274,273 | Child | Mar. 20, 1883 |
| 425,519 | Morse | Apr. 15, 1890 |
| 466,430 | Sheffield | Jan. 5, 1892 |
| 669,869 | White | Mar. 12, 1901 |
| 738,534 | Ferrahian | Sept. 8, 1903 |
| 921,757 | Wadhams | May 18, 1909 |
| 1,018,111 | Holdt | Feb. 20, 1912 |
| 1,976,972 | Valiquette | Oct. 16, 1934 |
| 2,329,549 | Maurer | Sept. 14, 1943 |